United States Patent
Arguello et al.

(10) Patent No.: US 10,953,786 B2
(45) Date of Patent: Mar. 23, 2021

(54) VEHICLE WITH HEADLAMP ASSEMBLY

(71) Applicant: Ford Global Technologies, LLC, Dearborn, MI (US)

(72) Inventors: Daniel Alejandro Arguello, Coyoacan (MX); Davinder Basra, Windsor (CA); Sydney Schaaf, Hazel Park, MI (US); Martin D. Lopez, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/528,752

(22) Filed: Aug. 1, 2019

(65) Prior Publication Data

US 2021/0031674 A1 Feb. 4, 2021

(51) Int. Cl.
*B60Q 1/04* (2006.01)
*F21S 41/25* (2018.01)
*B60R 13/00* (2006.01)

(52) U.S. Cl.
CPC .......... *B60Q 1/0483* (2013.01); *B60R 13/005* (2013.01); *F21S 41/25* (2018.01)

(58) Field of Classification Search
CPC ...... B60Q 1/0483; F21S 41/29; F21S 41/295; F21S 41/55; F21S 43/27; F21S 43/51; F21S 41/25; F21V 17/005; F21V 17/104; B60R 13/005
USPC .......................................................... 29/453
See application file for complete search history.

(56) References Cited

U.S. PATENT DOCUMENTS

| 2,734,129 | A | * | 2/1956 | Kahla | B60Q 1/18 362/293 |
| 4,538,213 | A | * | 8/1985 | Martin | B60Q 1/04 362/510 |
| 6,312,145 | B1 | * | 11/2001 | Rhoad | F21S 48/155 362/311.14 |
| 6,382,818 | B1 | * | 5/2002 | Iwama | F21V 17/164 362/374 |
| 6,386,624 | B1 | * | 5/2002 | Schultz | B62D 25/084 180/68.4 |
| 8,196,978 | B2 | * | 6/2012 | Shin | B62D 25/084 293/115 |
| 9,254,782 | B2 | | 2/2016 | Chen | |
| 10,207,629 | B2 | | 2/2019 | Kandlbinder et al. | |
| 2001/0046140 | A1 | * | 11/2001 | Chase | B60Q 1/0491 362/549 |
| 2004/0125613 | A1 | * | 7/2004 | Hasegawa | F21S 41/29 362/507 |
| 2004/0160784 | A1 | * | 8/2004 | Park | B62D 25/084 362/507 |
| 2005/0088015 | A1 | * | 4/2005 | Kishikawa | B60Q 1/0433 296/193.09 |

(Continued)

*Primary Examiner* — Jong-Suk (James) Lee
*Assistant Examiner* — James M Endo
(74) *Attorney, Agent, or Firm* — David Coppiellie; Carlson, Gaskey & Olds, P.C.

(57) ABSTRACT

This disclosure relates to a motor vehicle with a headlamp assembly, and a corresponding method. In an example, a motor vehicle includes a fascia including an opening and a rear face having one of a projection and a recess. The motor vehicle further includes a lamp including a front face having the other of the projection and the recess. The projection and the recess are configured such that when the projection is received in the recess a lens of the lamp is aligned with the opening.

14 Claims, 4 Drawing Sheets

(56) References Cited

U.S. PATENT DOCUMENTS

| | | | |
|---|---|---|---|
| 2006/0255602 A1* | 11/2006 | Evans | B60R 19/18 |
| | | | 293/120 |
| 2007/0057534 A1* | 3/2007 | Ziaja | B62D 25/084 |
| | | | 296/193.01 |
| 2008/0185872 A1* | 8/2008 | Povinelli | B62D 25/084 |
| | | | 296/193.09 |
| 2008/0259628 A1* | 10/2008 | Lin | F21S 41/28 |
| | | | 362/520 |
| 2009/0008818 A1* | 1/2009 | Fayt | B60Q 1/0475 |
| | | | 264/239 |
| 2015/0260363 A1* | 9/2015 | Cubing | B60Q 1/0035 |
| | | | 362/514 |
| 2017/0051890 A1 | 2/2017 | Kolobaric et al. | |
| 2017/0327029 A1* | 11/2017 | Tsumiyama | B60Q 1/0433 |
| 2018/0186417 A1* | 7/2018 | Carroll | B60Q 1/0475 |
| 2018/0304945 A1 | 10/2018 | Hickey | |

\* cited by examiner

VEHICLE WITH HEADLAMP ASSEMBLY

TECHNICAL FIELD

This disclosure relates to a motor vehicle with a headlamp assembly, and a corresponding method.

BACKGROUND

Motor vehicles include headlamps, which are lamps attached to the front of the vehicle to illuminate the road ahead. Headlamps are known to include a housing, a light source, and a lens. When mounting a headlamp to a vehicle, one typically must align the headlamp relative to various fasciae such as the front quarter panel, grille, hood, and bumper of the vehicle.

SUMMARY

A motor vehicle according to an exemplary aspect of the present disclosure includes, among other things, a fascia including an opening and a rear face having one of a projection and a recess. The motor vehicle further includes a lamp including a front face having the other of the projection and the recess. The projection and the recess are configured such that when the projection is received in the recess a lens of the lamp is aligned with the opening.

In a further non-limiting embodiment of the foregoing motor vehicle, the lamp is a headlamp.

In a further non-limiting embodiment of any of the foregoing motor vehicles, the other of the projection and the recess is in a front face of a housing of the lamp, and the housing surrounds the lens.

In a further non-limiting embodiment of any of the foregoing motor vehicles, the fascia completely surrounds the lens.

In a further non-limiting embodiment of any of the foregoing motor vehicles, when the lens of the lamp is aligned with the opening, the lens is spaced-apart from the fascia by a substantially constant distance about an entirety of a perimeter of the lens.

In a further non-limiting embodiment of any of the foregoing motor vehicles, the distance is at least 2 millimeters.

In a further non-limiting embodiment of any of the foregoing motor vehicles, when the lens of the lamp is aligned with the opening, a front face of the lens projects forward of a front face of the fascia.

In a further non-limiting embodiment of any of the foregoing motor vehicles, the one of the projection and the recess in the rear face of the fascia includes a plurality of recesses in the rear face of the fascia, the other of the projection and the recess in the front face of the headlamp includes a plurality of projections in the front face of the headlamp, and each of the projections is configured to be received in a respective one of the recesses.

In a further non-limiting embodiment of any of the foregoing motor vehicles, at least some of the projections include a first leg and a second leg extending substantially normal to the first leg.

In a further non-limiting embodiment of any of the foregoing motor vehicles, the vehicle includes fasteners configured to attach the lamp to the fascia.

In a further non-limiting embodiment of any of the foregoing motor vehicles, the fascia is a grille.

In a further non-limiting embodiment of any of the foregoing motor vehicles, the lamp is a first headlamp, the motor vehicle includes a second headlamp, and each of the first headlamp and the second headlamp includes an opening in a rear thereof such that when the first headlamp and the second headlamp are attached to the fascia a subassembly including the first headlamp, the second headlamp, and the fascia can be lifted by a tool received in the openings.

An assembly for a motor vehicle according to an exemplary aspect of the present disclosure includes a grille including a first opening and a second opening. The grille further includes a rear face having a plurality of recesses. The assembly further includes a first headlamp and a second headlamp. Each of the first headlamp and the second headlamp includes a front face having a plurality of projections configured for receipt into respective ones of the recesses such that when the projections are received in the recesses a lens of the first headlamp is aligned with the first opening and a lens of the second headlamp is aligned with the second opening. The grille, first headlamp, and second headlamp may be further configured according to any one or more of the preceding paragraphs.

A method according to an exemplary aspect of the present disclosure includes, among other things, aligning a lens of a headlamp with an opening in a fascia of a motor vehicle by receiving a projection of one of the headlamp and the fascia in a recess of the other of the headlamp and the fascia.

In a further non-limiting embodiment of the foregoing method, when the headlamp is aligned with the opening, the fascia completely surrounds the lens.

In a further non-limiting embodiment of any of the foregoing methods, when the headlamp is aligned with the opening, the lens is spaced-apart from the fascia by a substantially constant distance about an entirety of a perimeter of the lens.

In a further non-limiting embodiment of any of the foregoing methods, at least some of the projections include a first leg and a second leg extending substantially normal to the first leg.

In a further non-limiting embodiment of any of the foregoing methods, the method includes attaching the headlamp to the fascia using fasteners.

In a further non-limiting embodiment of any of the foregoing methods, the fascia is a grille.

In a further non-limiting embodiment of any of the foregoing methods, the headlamp is a first headlamp, the motor vehicle includes a second headlamp, and the method further includes lifting the first headlamp, the second headlamp, and the fascia by engaging a tool with openings formed in a rear of the first headlamp and the second headlamp.

DETAILED DESCRIPTION

This disclosure relates to a motor vehicle with a headlamp assembly, and a corresponding method. In an example, a motor vehicle includes a fascia including an opening and a rear face having one of a projection and a recess. The motor vehicle further includes a lamp including a front face having the other of the projection and the recess. The projection and the recess are configured such that when the projection is received in the recess a lens of the lamp is aligned with the opening. This arrangement increases the ease of assembling the lamp relative to the fascia because alignment is set by the projection and recess. These and other benefits will be appreciated from the below description.

Figure 1:
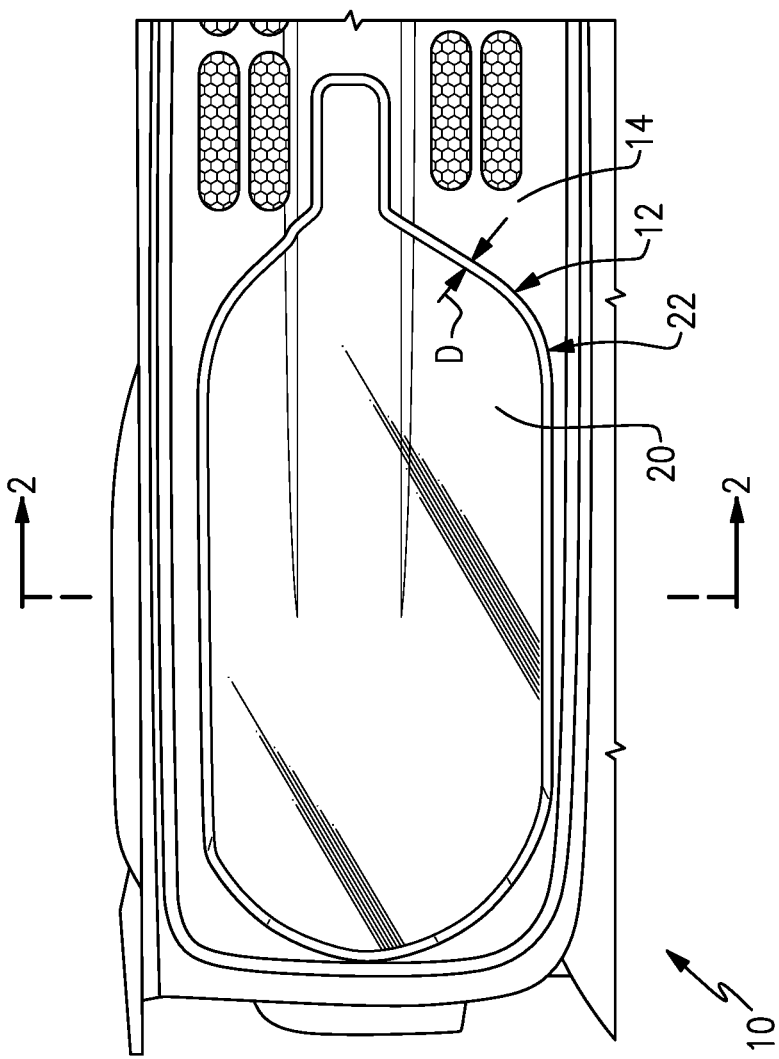
FIG. 1 is a front view of a portion of an example headlamp assembly for a motor vehicle, and in particular illustrates a headlamp and a portion of a grille.

FIG. 1 illustrates a portion of a headlamp assembly 10 ("assembly 10") for a motor vehicle. The assembly 10 includes a headlamp 12 and a fascia, which in this example is a front fascia, namely a grille 14. While this disclosure specifically references headlamps and a grille, the concepts described herein could be used to align other types of lights relative to other types of fascia. Further, while only one headlamp is shown in FIG. 1, it should be understood that a second headlamp is attached to the grille 14 on an opposite side as the headlamp 12. The headlamp 12 is representative of the arrangement of the second headlamp. Together, the headlamps are configured to illuminate the road ahead of the vehicle.

With reference to FIGS. 1-4, the headlamp 12 includes a front housing 16, a rear housing 18, a lens 20, and a light source (not shown). The front housing 16 surrounds and supports the lens 20, which is transparent and configured to direct light from the light source to the road ahead of the motor vehicle. The lens 20 projects forward of the front housing 16. The rear housing 18 supports the light source. The front and rear housings 16, 18 may be made of opaque plastic materials, whereas the lens 20 is made of a transparent material, such as plastic or glass. The front housing 16 and the lens 20 may be formed together by overmolding, for example. The front and rear housings 16, 18 may be attached using fasteners or adhesive, for example.

Figure 5:
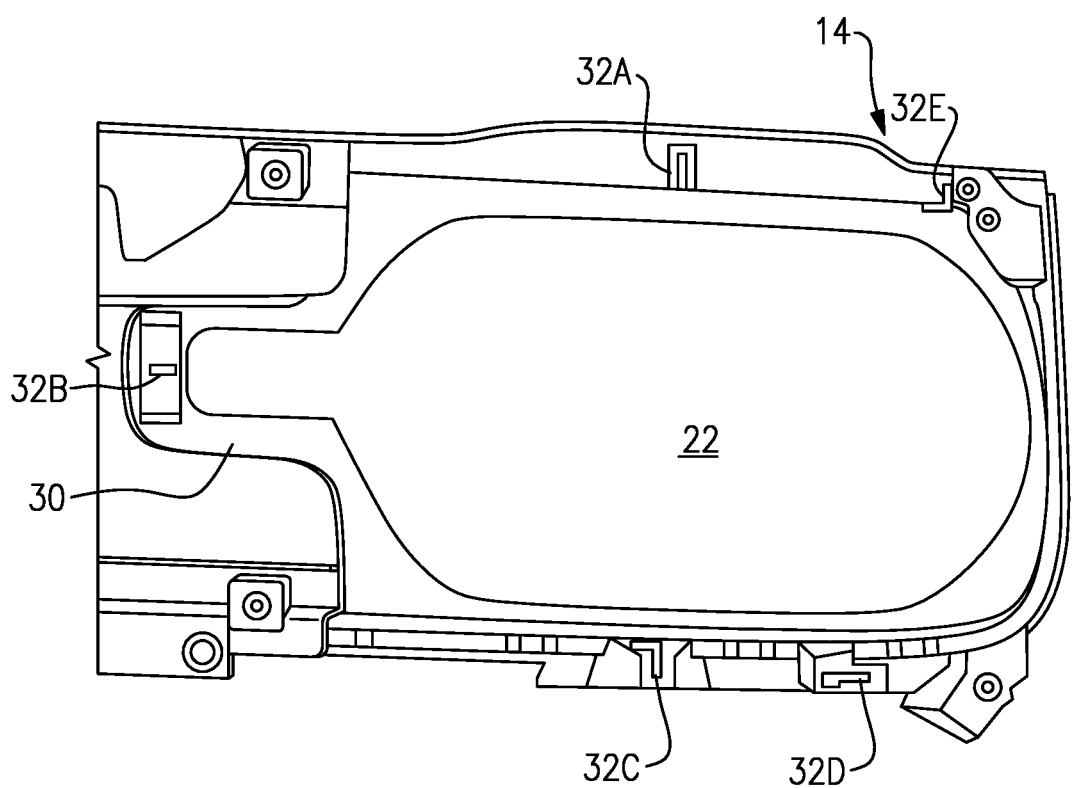
FIG. 5 is a rear view of an example grille.

FIG. 5 is a rear view of a portion of the grille 14. In this example, the grille 14 includes an opening 22 sized and configured to receive the lens 20 of therein. In particular, the opening 22 is sized and configured such that the grille 14 completely surrounds the lens 20, meaning that the grille 14 surrounds an entirety of a perimeter of the lens 20. The opening 22 is defined by a continuous, uninterrupted edge of the grille 14 in this example. In order to achieve good fit and finish, the headlamp 12 is centered within the opening 22 using a plurality of alignment features before it is rigidly attached to the grille 14 using fasteners. Example alignment features will now be described.

In order to align the lens 20 with the opening 22, in this example a front face 26 of the front housing 16 includes a plurality of projections 28A-28E (FIG. 3) projecting forward of the front face 26. The projections 28A-28E may be ribs in one example. Further, a rear face 30 the grille 14 includes a plurality of recesses 32A-32E (FIG. 5) formed therein. The recesses 32A-32E are sized and shaped to correspond to the size and shape of a respective one of the projections 28A-28E. The headlamp 12 and grille 14 are configured such that when the projections 28A-28E are received in the recesses 32A-32E, the lens 20 is aligned with the opening 22, as in FIGS. 1 and 2. In this context, the term "aligned" means that the position of the lens 20 relative to the opening 22 is as it would be during use of the motor vehicle. In other words, when the projections 28A-28E are in the recesses 32A-32E, the relative position of the lens 20 and opening 22 is set and further movement of the headlamp 12 is not required in order to properly position of the lens 20. This aspect of the disclosure significantly reduces assembly time.

Figure 3:
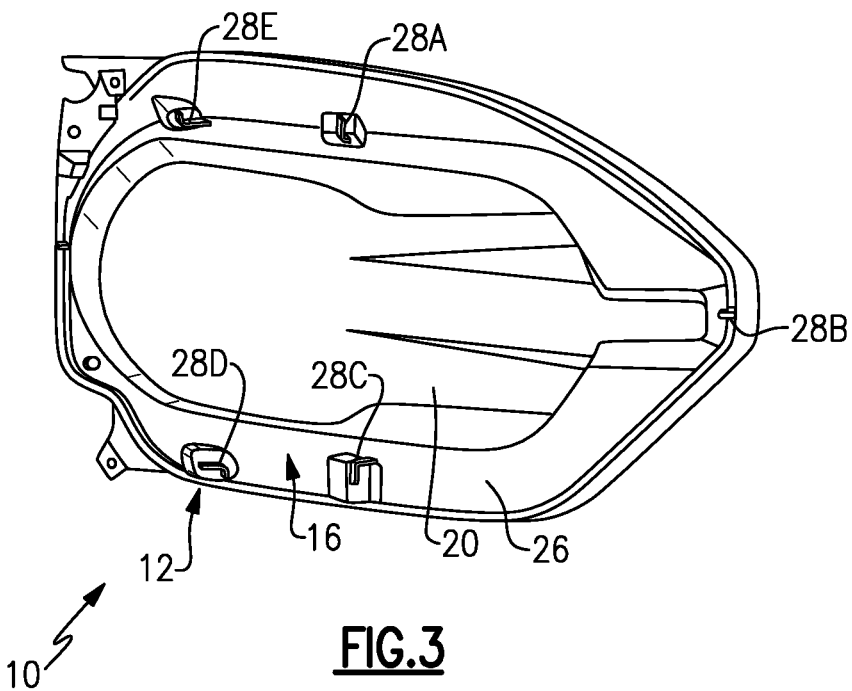
FIG. 3 is a front view of an example headlamp.

While in FIGS. 3 and 5 there are five projections 28A-28E and five recesses 32A-32E, this disclosure extends to arrangements with one or more projections and recesses. Further, while the headlamp 12 includes projections and the grille 14 includes recesses, this disclosure extends to arrangements where the headlamp 12 includes recesses and the grille 14 includes projections.

The projections 28A-28E and recesses 32A-32E are sized and shaped to permit alignment and prevent rotation of the headlamp 12 relative to the grille 14. The projections 28A-28E may be configured to restrict movement of the headlamp 12 in at least two ways.

Figure 6:
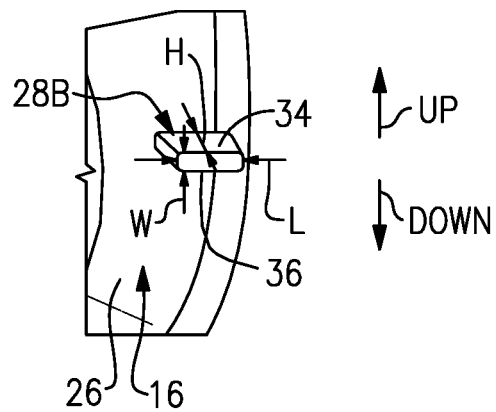
FIG. 6 is a close-up view of a projection of the headlamp.

An example projection 28B configured to restrict two-way movement of the headlamp 12 relative to the grille 14 is shown in FIG. 6. The projection 28B extends in a forward direction from the front face 26 by a height dimension H and exhibits a width W along a length dimension L. The length dimension L is the largest dimension of the projection 28B, and extends laterally in this example. As such, when the projection 28B is received in the recess 32B, top and bottom faces 34, 36 of the projection 28B restrict vertical movement of the headlamp 12 in the "up" and "down" directions, which are labeled in FIG. 6 for reference.

Figure 7:
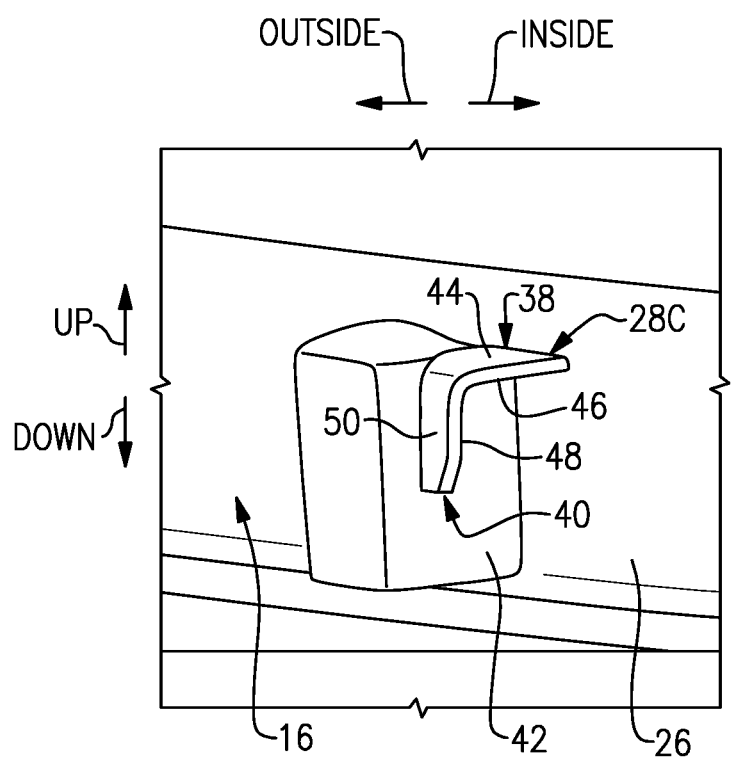
FIG. 7 is a close-up view of another projection of the headlamp.

An example projection 28C configured to restrict four-way movement of the headlamp 12 is shown in FIG. 7. The projection 28C includes a first leg 38 arranged substantially similarly to the projection 28B, and further includes a second leg 40 arranged similar to the first leg 38 but extending downward in a direction substantially normal to the first leg 38. The first and second legs 38, 40 are arranged such that they substantially resemble an L-shape rotated 90° with equal-sized legs. The first and second legs 38, 40 may be different sizes in other examples.

In this example, the first and second legs 38, 40 project from a platform 42 formed in the front face 26. The platform 42 may be used when the front face 26 has a non-flat contour, in order to provide a substantially flat and square surface from which the projection 28C extends. The projection 28C is configured to be received in the recess 32C. When in the recess 32C, first and second faces 44, 46 of the first leg 38 restrict vertical movement (i.e., in the "up" and "down" directions) of the headlamp 12 relative to the grille 14, and first and second faces 48, 50 of the second leg 40 restrict lateral movement of the headlamp 12 in the "inside" and "outside" directions relative to the grille 14.

While exemplary shapes are shown for the projections 28B and 28C in FIGS. 6 and 7, it should be understood that this disclosure extends to other shapes. Further, any of the projections 28A-28E could exhibit any number of shapes, including but not limited to those shown in FIGS. 6 and 7. The recesses 32A-32E exhibit shapes corresponding to those of the respective projections 28A-28E.

With reference back to FIG. 1, when the lens 20 of the headlamp 12 is aligned in the opening 22, the lens 20 is spaced-apart from the grille 14 by a substantially constant distance D about an entirety of a perimeter of the lens 20. Specifically, the lens 20 is spaced-apart from an edge of the grille 14 defining the opening 22 by the distance D. The distance D is at least 2 millimeters in one example. The projections 28A-28E and recesses 32A-32E are configured to ensure the lens 20 is spaced-apart from the grille 14 by the distance D in order to protect the lens 20.

Figure 2:
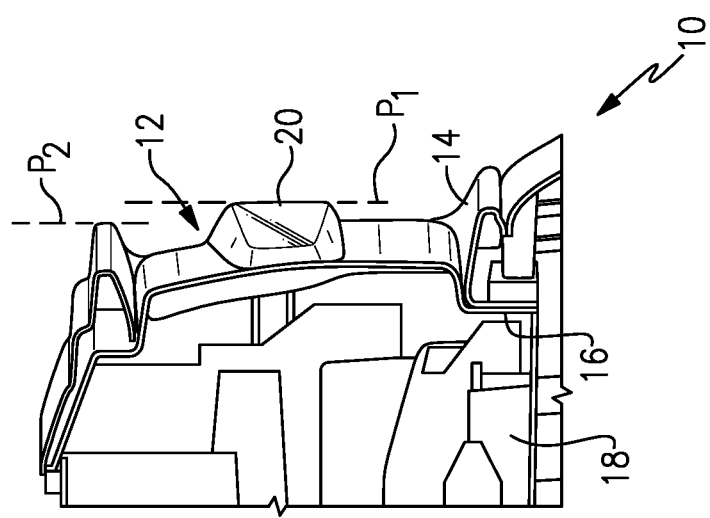
FIG. 2 is a cross-sectional view of the assembly of FIG. 1 taken along line 2-2.

With reference to FIG. 2, the arrangement of projections 28A-28E and recesses 32A-32E permits the lens 20 to at least partially project forward of the grille 14, while also permitting the grille 14 to completely surround the lens 20. For instance, a forward-most point of the lens 20 lies in a plane $P_1$ which is spaced-apart from a plane $P_2$ of a front face of a portion of the grille 14. The alignment features discussed herein permit the lens 20 to be configured such that it substantially follows the contours of the grille 14 and/or projects forward of the grille 14 to provide a unique aesthetic appearance.

Figure 4:
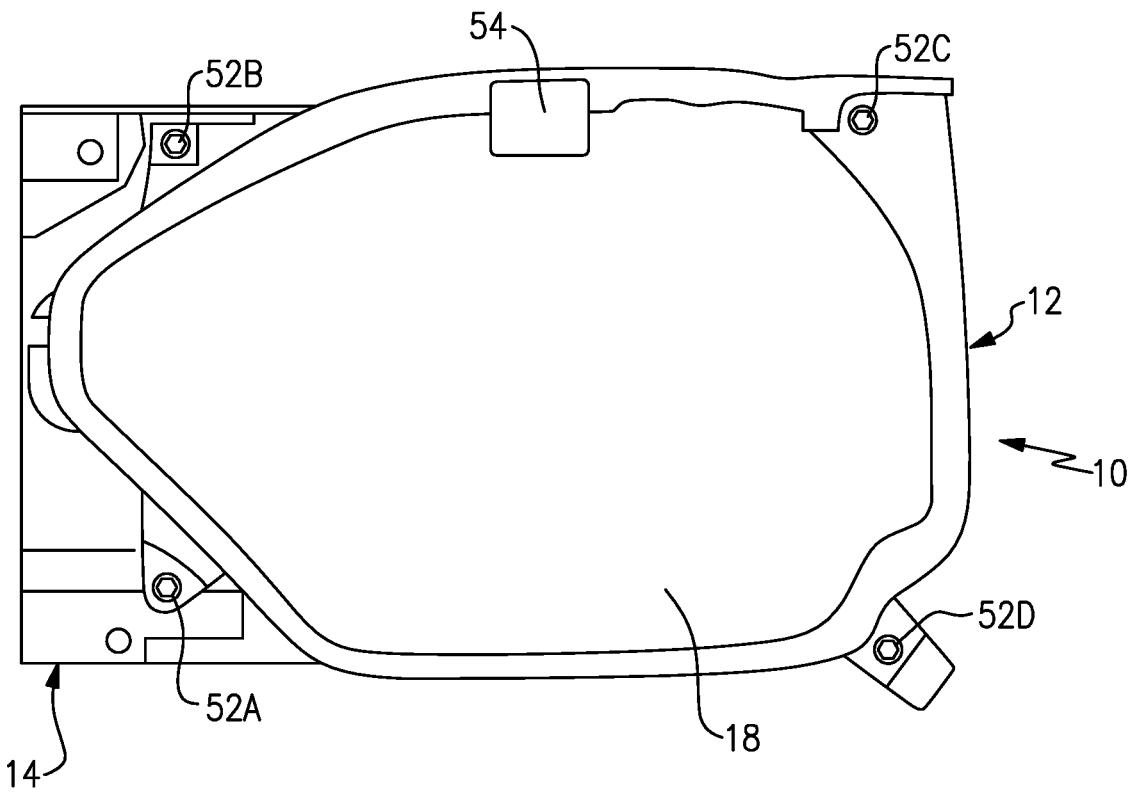
FIG. 4 is a rear view of the example headlamp.

With reference to FIG. 4, after aligning the lens 20 in the opening 22, a plurality of fasteners 52A-52D are configured to attach the headlamp 12 to the grille 14. The fasteners 52A-52D may be any type of known mechanical fasteners, including bolts, screws, clamps, clasps, etc. There are four fasteners 52A-52D arranged at corners of the headlamp 12, in this example, but it should be understood that other fastener arrangements come within the scope of this disclosure.

In this example, the lens 20 is aligned with the opening 22 by movement of the headlamp 12 in a forward direction toward a rear of the grille 14. Such movement is repeatable and intuitive and increases the ease of assembly. The fasteners 52A-52D likewise are inserted in a forward direction from the rear of the headlamp 12 and grille 14, in this example. With the alignment features discussed above, one does not need to be concerned with alignment when tightening the fasteners 52A-52D.

The headlamp 12 and another substantially similar headlamp may be attached to the grille 14 before the assembly 10 is attached to the remainder of the motor vehicle. In this way, proper alignment of the assembly 10 can be achieved before mounting to the remainder of the motor vehicle.

The assembly 10 may be relatively heavy. Thus, in one aspect of this disclosure, the rear housing 18 of the headlamp 12 includes a lift-assist feature. An example lift-assist feature includes an opening 54 configured to receive a tool or a hand of a user, as examples. The headlamp on the opposite side of the grille 14 may include a similar opening. Thus, a tool or a user may engage both openings simultaneously to lift the assembly 10 and mount it to the remainder of the motor vehicle.

It should be understood that terms such as "about," "substantially," and "generally" are not intended to be boundaryless terms, and should be interpreted consistent with the way one skilled in the art would interpret those terms. It should also be understood that directional terms such as "forward," "rear," "side," "lateral," "vertical," "up," "down," etc., are used herein relative to the normal operational attitude of a vehicle for purposes of explanation only, and should not be deemed limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
a fascia including an opening, the fascia further including a rear face having one of a plurality of projections and a plurality of recesses; and
a lamp including a front face having the other of the projections and the recesses, wherein at least one of the projections is differently-shaped relative to others of the projections, wherein the recesses are shaped to correspond to a shape of a respective one of the projections such that when the projections are received in a respective one of the recesses a lens of the lamp is aligned with the opening,
wherein the lamp is a headlamp,
wherein the opening is sized and configured such that, when the lens is aligned with the opening, the fascia completely surrounds an entirety of a perimeter of the lens,
wherein, when the lens is aligned with the opening, a front face of the lens projects forward of a front face of a portion of the fascia adjacent a top of the lens, and
wherein a first group of the projections include a first leg and a second leg extending substantially normal to the first leg and at least one of the projections is configured differently than the first group.

2. The motor vehicle as recited in claim 1, wherein:
the other of the projections and the recesses are in a front face of a housing of the lamp, and
the housing surrounds the lens.

3. The motor vehicle as recited in claim 1, wherein, when the lens is aligned with the opening, the lens is spaced-apart from the fascia by a substantially constant distance about an entirety of a perimeter of the lens.

4. The motor vehicle as recited in claim 3, wherein the distance is at least 2 millimeters.

5. The motor vehicle as recited in claim 1, further comprising fasteners configured to attach the lamp to the fascia.

6. The motor vehicle as recited in claim 1, wherein the fascia is a grille.

7. The motor vehicle as recited in claim 1, wherein:
the lamp is a first headlamp,
the motor vehicle includes a second headlamp, and
each of the first headlamp and the second headlamp includes an opening in a rear thereof.

8. The motor vehicle as recited in claim 1, wherein, when the lens of the lamp is aligned with the opening and when the lens and fascia are viewed along a cross-section taken along a line extending parallel to a centerline of the motor vehicle, the front face of the lens lies in a plane spaced-apart forward of a plane containing the front face of the portion of the fascia adjacent the top of the lens.

9. An assembly for a motor vehicle, comprising:
a grille including a first opening and a second opening, the grille further including a rear face having a plurality of recesses;
a first headlamp;
a second headlamp, wherein each of the first headlamp and the second headlamp includes a front face having a plurality of projections configured for receipt into respective ones of the recesses, wherein at least one of the projections is differently-shaped relative to others of the projections, wherein the recesses are shaped to correspond to a shape of a respective one of the projections such that, when the projections are received in the recesses, a lens of the first headlamp is aligned with the first opening and a lens of the second headlamp is aligned with the second opening; and wherein each of the first headlamp and the second headlamp includes a housing surrounding a respective one of the lenses of the first headlamp and the second headlamp, and the plurality of projections are in a front face of the housings, wherein, when the lenses of the first headlamp and second headlamp are aligned with the respective first opening and second opening, the lenses are spaced-apart from the grille by a substantially constant distance of at least 2 millimeters about an entirety of a perimeter of the lens, wherein, when the lenses of the first headlamp and second headlamp are aligned with the respective first opening and second opening, the grille completely surrounds an entirety of a perimeter of the lenses of the first headlamp and the second headlamp, wherein a first group of the projections include a first leg and a second leg extending substantially normal to the first leg and at least some of the projections are configured differently than the first group, wherein each of the first headlamp and the second headlamp includes an opening in a rear thereof, and wherein, when the lenses of the first headlamp and second headlamp are aligned with the respective first opening and second opening, a front face of the lens of the first headlamp projects forward of a front face of a portion of the grille adjacent a top of the lens of the first headlamp, and a front face of the lens of the second headlamp projects forward of a front face of a portion of the grille adjacent a top of the lens of the second headlamp.

10. A method, comprising:
aligning a lens of a headlamp with an opening in a fascia of a motor vehicle by receiving projections of the headlamp in recesses of the fascia, wherein, when the headlamp is aligned with the opening, the fascia completely surrounds an entirety of a perimeter of the lens, wherein a first group of the projections includes a first leg and a second leg extending substantially normal to the first leg and at least one of the projections is configured differently than the first group, wherein, when the headlamp is aligned with the opening, a front face of the lens projects forward of a front face of a portion of the fascia adjacent a top of the lens, and wherein the recesses are shaped to correspond to a shape of a respective one of the projections such that when the projections are received in a respective one of the recesses, the lens of the headlamp is aligned with the opening.

11. The method as recited in claim 10, wherein, when the headlamp is aligned with the opening, the lens is spaced-apart from the fascia by a substantially constant distance about an entirety of a perimeter of the lens.

12. The method as recited in claim 10, further comprising attaching the headlamp to the fascia using fasteners.

13. The method as recited in claim 10, wherein the fascia is a grille.

14. The method as recited in claim 10, wherein:
the headlamp is a first headlamp,
the motor vehicle includes a second headlamp, and
further comprising lifting the first headlamp, the second headlamp, and the fascia by engaging openings formed in a rear of the first headlamp and the second headlamp.

* * * * *